(12) United States Patent
Takeuchi et al.

(10) Patent No.: US 9,416,286 B2
(45) Date of Patent: Aug. 16, 2016

(54) INK COMPOSITION FOR AQUEOUS BALLPOINT PEN

(71) Applicant: MITSUBISHI PENCIL COMPANY, LIMITED, Shinagawa-ku, Tokyo (JP)

(72) Inventors: Yoji Takeuchi, Yokohama (JP); Yusuke Kobayashi, Yokohama (JP); Noriko Sakane, Yokohama (JP); Saki Hanatani, Fujioka (JP)

(73) Assignee: MITSUBISHI PENCIL COMPANY, LIMITED, Tokyo (JP)

(*) Notice: Subject to any disclaimer, the term of this patent is extended or adjusted under 35 U.S.C. 154(b) by 0 days.

(21) Appl. No.: 14/434,500

(22) PCT Filed: Oct. 10, 2013

(86) PCT No.: PCT/JP2013/077625
§ 371 (c)(1),
(2) Date: Apr. 9, 2015

(87) PCT Pub. No.: WO2014/058024
PCT Pub. Date: Apr. 17, 2014

(65) Prior Publication Data
US 2015/0275000 A1 Oct. 1, 2015

(30) Foreign Application Priority Data

Oct. 12, 2012 (JP) .................................. 2012-227001
Sep. 27, 2013 (JP) .................................. 2013-202104

(51) Int. Cl.
| | | |
|---|---|---|
| *B43K 7/00* | (2006.01) | |
| *C09D 11/18* | (2006.01) | |
| *C08K 3/38* | (2006.01) | |
| *C08K 5/17* | (2006.01) | |
| *C08K 5/3475* | (2006.01) | |
| *C08K 5/521* | (2006.01) | |
| *C09D 105/00* | (2006.01) | |
| *C09D 129/04* | (2006.01) | |

(52) U.S. Cl.
CPC . *C09D 11/18* (2013.01); *B43K 7/00* (2013.01); *C08K 3/38* (2013.01); *C08K 5/17* (2013.01); *C08K 5/3475* (2013.01); *C08K 5/521* (2013.01); *C09D 105/00* (2013.01); *C09D 129/04* (2013.01); *C08K 2003/387* (2013.01)

(58) Field of Classification Search
None
See application file for complete search history.

(56) References Cited

U.S. PATENT DOCUMENTS

| | | | | | |
|---|---|---|---|---|---|
| 5,990,201 | A * | 11/1999 | Miyazaki | ............... | C09D 11/18 106/31.13 |
| 6,146,452 | A * | 11/2000 | Takeuchi | ............... | C09D 11/18 106/31.58 |
| 6,176,910 | B1 * | 1/2001 | Miyazaki | ............... | C09D 11/16 106/31.36 |
| 6,261,351 | B1 * | 7/2001 | Miyamoto | ............. | C09D 11/18 106/31.36 |
| 6,264,729 | B1 * | 7/2001 | Miyamoto | ............. | C09D 11/16 106/31.36 |
| 6,423,127 | B1 * | 7/2002 | Miyamoto | ............. | C09D 11/18 106/31.35 |
| 6,485,609 | B1 * | 11/2002 | Boylan | ................ | B41M 5/5254 162/135 |
| 6,599,352 | B1 * | 7/2003 | Miyamoto | ............. | C09D 11/16 106/31.36 |
| 7,232,480 | B2 * | 6/2007 | Momose | ............... | B82Y 30/00 106/31.6 |
| 7,279,512 | B2 * | 10/2007 | Iwamoto | ............... | C09D 11/18 523/161 |
| 7,345,100 | B2 * | 3/2008 | Iwamoto | ............... | C09D 11/18 523/161 |
| 2002/0007764 | A1 * | 1/2002 | Takeuchi | ............... | C09D 11/18 106/31.43 |
| 2003/0196568 | A1 * | 10/2003 | Miyamoto | ............. | C09D 11/18 106/31.58 |
| 2004/0240925 | A1 * | 12/2004 | Iida | ....................... | B43K 5/005 401/41 |
| 2004/0247369 | A1 * | 12/2004 | Iida | ....................... | B43K 5/005 401/42 |
| 2005/0074273 | A1 * | 4/2005 | Miyamoto | ............... | B43K 7/08 401/141 |
| 2005/0120914 | A1 * | 6/2005 | Momose | ................ | B82Y 30/00 106/31.65 |
| 2006/0047017 | A1 * | 3/2006 | Miyamoto | ............... | B43K 7/02 523/161 |
| 2006/0173094 | A1 * | 8/2006 | Ikoma | ................... | C09D 11/16 523/161 |
| 2015/0093176 | A1 * | 4/2015 | Kobayashi | .............. | B43K 7/01 401/209 |

FOREIGN PATENT DOCUMENTS

| | | | |
|---|---|---|---|
| EP | 0 997 509 | A1 | 5/2000 |
| EP | 1 036 833 | A1 | 9/2000 |
| JP | 54-143340 | A | 11/1979 |
| JP | 59-74175 | A | 4/1984 |
| JP | 06-88050 | A | 3/1994 |
| JP | 2000-345090 | A | 12/2000 |
| JP | 2002-103876 | A | 4/2002 |
| JP | 2002-194261 | A | 7/2002 |
| JP | 2002194261 | A * | 7/2002 |
| JP | 2002-338869 | A | 11/2002 |

OTHER PUBLICATIONS

PCT International Preliminary Report on Patentability (IPRP) and Written Opinion mailed on Apr. 23, 2015, in corresponding International Application No. PCT/JP2013/077625 (7 pages).
International Search Report (PCT/ISA/210) mailed on Dec. 3, 2013, by the Japanese Patent Office as the International Searching Authority for International Application No. PCT/JP2013/077625.
Extended European Search Report issued Apr. 20, 2016, by the European Patent Office in corresponding European Patent Application No. 13845865 (7 pages).
XP002756149, Database WPI, Week 200330, Thomson Scientific, London, GB.

* cited by examiner

*Primary Examiner* — Peter A Salamon
(74) *Attorney, Agent, or Firm* — Buchanan, Ingersoll & Rooney PC

(57) ABSTRACT

Provided is an ink composition for an aqueous ballpoint pen making it possible to draw sharp and fine lines which are less likely to be blurred at an initial part of writing and are written smoothly and which are clear at stop, jump and sweep parts to provide beautiful characters. The ink composition for an aqueous ballpoint pen contains at least water and a colorant and having a dilatant fluid characteristic in at least a part of a region of a shear rate of 1 to 383 $s^{-1}$ (25° C.).

4 Claims, 3 Drawing Sheets

INK COMPOSITION FOR AQUEOUS BALLPOINT PEN

TECHNICAL FIELD

The present invention relates to an ink composition for an aqueous ballpoint pen making it possible to draw sharp and fine lines which are less likely to be blurred at an initial part of writing and are written smoothly and which are clear at stop, jump and sweep parts to provide beautiful characters.

BACKGROUND ART

Characteristics of an ink having a shear thinning property have so far been utilized in gel ink ballpoint pens. The above ink composition for a ballpoint pen contains a thickener (gelling agent) showing a shear thinning property, and known are, for example, 1) an ink composition for an aqueous ballpoint pen characterized by containing 0.20 to 0.45% by weight of a xanthan gum (refer to, for example, a patent document 1) and 2) an aqueous ink composition for a writing instrument suitable for a ballpoint pen, comprising as essential components, a) a colorant, b) an organic acid-modified heteropolysaccharide which comprises a fundamental unit constituted by glucose/galactose/pyruvic acid or a salt thereof/succinic acid or a salt thereof/acetic acid of 5 to 8/1 to 2/0.5 to 2/0.5 to 2/0.5 to 1 in terms of a molar ratio and which has an average molecular weight of about 1,000,000 to about 8,000,000 and c) an aqueous medium comprising water and a water-soluble organic medium, wherein water accounts for 50% by weight or more (refer to, for example, a patent document 2).

The above gel inks having a shear thinning property are characterized by that they have, as shown in FIG. 1, a high viscosity when not used for writing (in non-writing) and are inhibited from dropping and that when used for writing (in high shearing), they are decreased in a viscosity by virtue of an action of a rotating ball to make it possible to write smoothly. They show a viscosity flow curve in which a viscosity is gradually reduced as a shear rate is elevated.

However, the conventional gel inks having such the viscosity activities as described above have the problem that they have a heavy writing feeling at an initial part of writing and are liable to be blurred and drop. Further, involved therein is the problem that the inks are extremely reduced in a viscosity during writing, whereby the drawn lines are decreased in a density in a stop part and split in a sweep part, and the sharp drawn lines tend to be less likely to be obtained.

On the one hand, for example, an aqueous pigment ink comprising at least titanium oxide, an extender pigment, a dispersant, an emulsion of polyvinyl alcohol and/or a styrene•acryl base copolymer each having a polymerization degree of 200 to 1000, and water (refer to, for example, a patent document 3) is known as an ink for a writing instrument such as a marking pen and a ballpoint pen, in which polyvinyl alcohol is used.

On the other hand, an aqueous ink composition comprising alkali metal silicate and/or alkali metal borate in order to improve a corrosion resistance of a cemented carbide-made ball at a tip part of the pen, and an aqueous ballpoint pen charged with the same (refer to, for example, a patent document 4) are known as an aqueous ink composition in which alkali metal borate is used.

However, the polyvinyl alcohol in the ink for a writing instrument described in the foregoing patent document 3 is used in order to improve a dispersion stability of the pigment in freezing and thawing, and the objects and the problems are different from those in the present invention. In addition thereto, an ink having a dilatant fluid characteristic is neither described nor recognized therein at all.

Further, the alkali metal borate in the aqueous ink composition described in the patent document 4 described above is used in order to form a thin film of the above alkali metal borate on the ball to prevent the ball and the tip holder from being corroded, and the objects and the problems are different from those in the present invention. In addition thereto, an ink having a dilatant fluid characteristic is neither described nor recognized therein at all.

PRIOR ART DOCUMENTS

Patent Documents

Patent document 1: JP Sho 59-74175 A (claims, examples and the like)
Patent document 2: JP Hei 06-88050 A (claims, examples and the like)
Patent document 3: JP 2000-345090 A (claims, examples and the like)
Patent document 4: JP 2002-338869 A (claims, examples and the like)

DISCLOSURE OF THE INVENTION

In light of the problems on the conventional techniques described above, the present invention tries to solve them, and an object thereof is to provide an ink composition for an aqueous ballpoint pen making it possible to draw sharp and fine lines which are less likely to be blurred at an initial part of writing and are written smoothly and which are clear at stop, jump and sweep parts to provide beautiful characters.

In light of the conventional problems and the like described above, intense researches repeated by the present inventors have resulted in finding that in an ink composition for an aqueous ballpoint pen, an ink having a dilatant fluid characteristic in at least a part of a region of a specific shear rate has a hysteresis in which a viscosity is increased by a shearing force applied to the writing tip part in writing and makes it possible to draw sharp and fine lines which are less likely to be blurred at an initial part of writing and are written smoothly and which are clear at stop, jump and sweep parts to provide beautiful characters. Thus, they have come to complete the present invention.

That is, the present invention resides in the following items (1) to (4).
(1) An ink composition for an aqueous ballpoint pen comprising at least water and a colorant and having a dilatant fluid characteristic in at least a part of a region of a shear rate of 1 to 383 $s^{-1}$ (25° C.).
(2) The ink composition for an aqueous ballpoint pen as described in the above item (1), wherein the viscosity at a shear rate of 383 $s^{-1}$ (25° C.) is 5 to 150 mPa·s.
(3) The ink composition for an aqueous ballpoint pen as described in the above item (1) or (2), comprising at least one selected from polyvinyl alcohol and/or polysaccharides, and boric acid and a salt thereof.
(4) An aqueous ballpoint pen charged with the ink composition for an aqueous ballpoint pen as described in any one of the above items (1) to (3).

In the present invention, the term "dilatant fluid characteristic" means the state of a fluid which is increased in a viscosity as a shear rate becomes larger. Also, the term "at least a part of a region (of a shear rate)" shows a region ranging from an optional shear rate which is a standard up to a shear rate which is 1.2 time as large as the standard shear rate.

Accordingly, in the present invention, the term "having a dilatant fluid characteristic in at least a part of a region of a shear rate of 1 to 383 s$^{-1}$ (25° C.)" means that when, for example, 30 s$^{-1}$ is set to the standard shear rate, a viscosity at a shear rate of 30 s$^{-1}$ is compared with a viscosity at a shear rate of 36 s$^{-1}$ which is 1.2 time as large as the above shear rate and that if the viscosity at a shear rate of 36 s$^{-1}$ is higher than the viscosity at a shear rate of 30 s$^{-1}$, "a dilatant fluid characteristic is shown in at least a part of the region".

According to the present invention, provided is an ink composition for an aqueous ballpoint pen capable of drawing sharp and fine lines which are less likely to be blurred at an initial part of writing and are written smoothly and which are clear at stop, jump and sweep parts to provide beautiful characters.

The embodiment of the present invention shall be explained below in detail.

The ink composition for an aqueous ballpoint pen according to the present invention is characterized by comprising at least water and a colorant and having a dilatant fluid characteristic in at least a part of a region of a shear rate of 1 to 383 s$^{-1}$ (25° C.).

Figure 1:
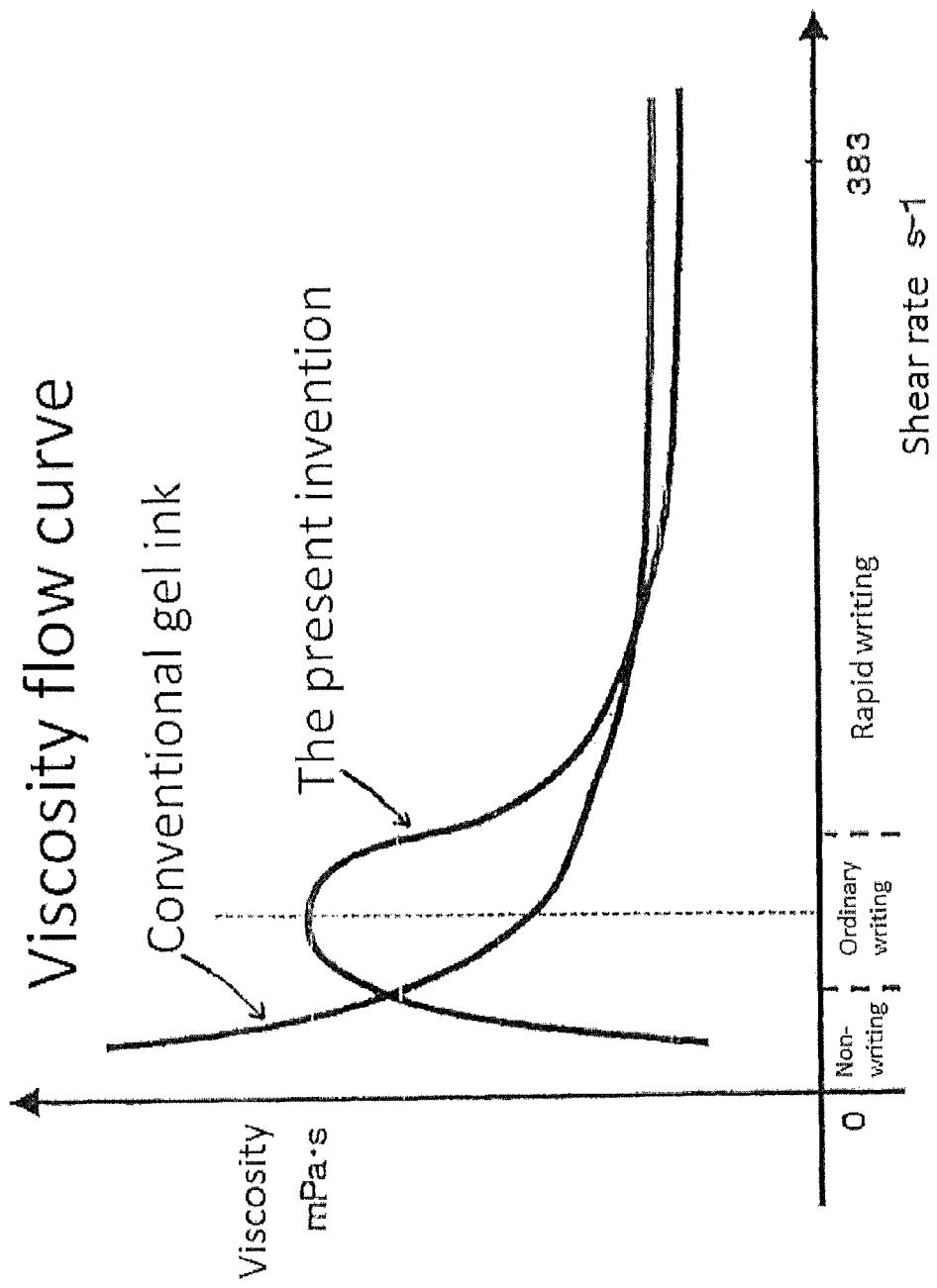
FIG. 1 is a characteristic chart (viscosity flow curve) showing the relation of a shear rate with an ink viscosity in a conventional gel ink and the ink composition for an aqueous ballpoint pen according to the present invention.

FIG. 1 is a characteristic chart (viscosity flow curve) showing the relation of a shear rate with an ink viscosity in a conventional gel ink and the ink composition for an aqueous ballpoint pen according to the present invention.

In the present invention, it is not until the ink composition is provided, as shown in FIG. 1, with a dilatant fluid characteristic in at least a part of a region of a shear rate of 1 to 383 s$^{-1}$ (25° C.) that obtained is the ink composition for an aqueous ballpoint pen capable of drawing sharp and fine lines which are less likely to be blurred at an initial part of writing and are written smoothly and which are clear at stop, jump and sweep parts to provide beautiful characters as compared with conventional gel inks showing a viscosity flow curve in which a viscosity is gradually reduced as a shear rate is elevated.

In the present invention, an ink of "a preferred state" having a dilatant fluid characteristic in a part of a region is preferably an ink having a dilatant fluid state in a whole region of a shear rate of 1 to 383 s$^{-1}$ (25° C.) (it may be an ink in which a viscosity is increased continuously at a shear rate of up to 383 s$^{-1}$, preferably an ink in which a viscosity has a maximum value (peak value) in a region of a shear rate of 1 to 200 s$^{-1}$ and more preferably an ink in which a viscosity has a maximum value (peak value) in a region of a shear rate of 10 to 150 s$^{-1}$).

An ink which changes from a dilatant fluid to a pseudoplastic fluid at a border of a certain shear rate, that is, an ink which is increased in a shear rate when written at a high speed and which maintains a dilatant fluid state even after exceeding a shear rate of 383 s$^{-1}$ tends to be reduced a little in a flowing property of the ink as compared with an ink which changes to a pseudoplastic fluid. An ink which changes to a pseudoplastic fluid at a shear rate of 10 to 150 s$^{-1}$ is preferred.

Thus, the specific rheological curve having a dilatant fluid characteristic according to the present invention as shown in FIG. 1 can be put into practice by selecting and combining suitable viscosity modifiers (thickeners).

In the present invention, the ink composition is liable to be adjusted to the state having a dilatant fluid characteristic in at least a part of a region of a shear rate of 1 to 383 s$^{-1}$ (25° C.) by adding at least water and a colorant and further adding at least one selected from, for example, polyvinyl alcohol and/or polysaccharides, and boric acid and a salt thereof.

The polyvinyl alcohol (hereinafter abbreviated merely as "PVA") which can be used in the present invention is represented by formula: —[CH$_2$—CH(OH)]$_m$—[CH$_2$—CH(OCOCH$_3$)]$_n$—, and it has a saponification degree [(m/(m+n))×100] of preferably 50 mol % or more, more preferably 75 mol % or more from the viewpoints of an aging stability and a thickening property of the ink.

PVA having the saponification degree described above has a polymerization degree (m+n) of preferably 300 or more, more preferably 300 to 3000 and particularly preferably 300 to 2000 from the viewpoints of enhancing a beautiful character feeling at stop, jump and sweep parts without damaging a writing feeling and a coloring property.

PVA which can specifically be used includes commercial G type Gohsenol series and K type Gohsenol series (trade names of Nippon Synthetic Chemical Industry Co., Ltd.) manufactured by Nippon Synthetic Chemical Industry Co., Ltd., J Poval series (trade names of Japan Vam & Poval Co., Ltd.) manufactured by Japan Vam & Poval Co., Ltd., KURARAY Poval PVA series (trade names of Kuraray Co., Ltd.) manufactured by Kuraray Co., Ltd., and the like.

PVA having the saponification degree and the polymerization degree each described above may be used alone or in combination of two or more kinds thereof.

Modified PVA, preferably modified PVA having a saponification degree and a polymerization degree which fall in the ranges described above can be used as well for PVA of the present invention. Modified PVA which can be used includes PVA obtained by modifying a hydroxyl group and an acetic acid group of PVA with a modifying group such a carboxyl group, a sulfonic acid group, an ethylene oxide group and the like, or PVA having the modified groups described above on side chains. Further, PVA•acrylic acid•methyl methacrylate copolymers prepared by copolymerizing partially saponified PVA with acrylic acid and methyl methacrylate can also be used as the modified PVA of the present invention.

The modified PVA which can specifically be used includes Gohsenex L series and Gohsenex WO series (trade names of Nippon Synthetic Chemical Industry Co., Ltd.) manufactured by Nippon Synthetic Chemical Industry Co., Ltd., anionically modified PVA (A series) (trade names of Japan Vam & Poval Co., Ltd.) manufactured by Japan Vam & Poval Co., Ltd., EXCEBAL 1713 (trade name of Kuraray Co., Ltd.) manufactured by Kuraray Co., Ltd., and the like. Also, the PVA.acrylic acid.methyl methacrylate copolymer includes POAVCOAT (trade name of Daido Chemical Corporation) manufactured by Daido Chemical Corporation, and the like.

The above modified PVA may be used alone or in combination of two or more kinds thereof.

A total content of the above PVA and modified PVA is preferably 0.2 to 8% by mass (hereinafter abbreviated merely as "%"), more preferably 0.4 to 5% and particularly preferably 1 to 4% based on a whole amount of the ink composition for an aqueous ballpoint pen.

If the above content is less than 0.2%, the thickening performance is not satisfactory, and a bleeding resistance of the drawn lines is reduced. On the other hand, if it exceeds 8%, a viscosity of the ink is too high, and a following performance thereof is lowered. Accordingly, both are not preferred.

The polysaccharides which can be used in the present invention include, for example, xanthan gum, guar gum, hydroxypropyl guar gum, casein, gum arabic, gelatin, amylose, agarose, agaropectin, arabinan, curdlan, callose, carboxymethyl starch, chitin, chitosan, quince seed, glucomannan, gellan gum, tamarind seed gum, dextran, nigeran, hyaluronic acid, pustulan, funoran, HM pectin, porphyran, laminaran, lichenan, carrageenan, alginic acid, tragacanth gum, arukashigamu, succinoglycan, locust bean gum, tara gum, and the like. They may be used alone or in combination of two or more kinds thereof.

The above polysaccharides are useful as a material for supplementing adjustment of the viscosity, and a content thereof is preferably 0.03 to 1.5%, more preferably 0.05 to 0.8% based on a whole amount of the ink composition for an aqueous ball point pen.

If the above content is less than 0.03%, the thickening performance is not satisfactory, and a bleeding resistance of the drawn lines is reduced. On the other hand, if it exceeds 1.5%, a viscosity of the ink is too high, and a following performance thereof is liable to be lowered. Accordingly, both are not preferred.

The boric acid and the salt thereof which can be used in the present invention include boric acid, alkaline metal salts (lithium, sodium, potassium and rubidium) of boric acid, an ammonium salt of boric acid, and the like. They include, for example, boric acid ($H_3BO_3$), diboron trioxide ($B_2O_3$), sodium metaborate ($NaBO_2$), sodium diborate ($Na_4B_2O_5$), sodium tetraborate ($Na_2B_4O_7$), sodium pentaborate ($NaB_5O_8$), sodium hexaborate ($Na_2B_6O_{10}$), sodium octaborate ($NaB_8O_{13}$), ammonium borate [$(NH_4)_2O \cdot 5B_2O_3$), and hydrates thereof, and the like. They may be used alone or in combination of two or more kinds thereof.

Sodium tetraborate, ammonium borate and diboron trioxide are preferably used from the viewpoints of a solubility in ink components and a versatility.

A total content of the above boric acid and salt thereof is preferably 0.01 to 1% by mass, more preferably 0.1 to 1% by mass based on a whole amount of the ink composition for an aqueous ballpoint pen.

If the content of the boric acid and the salt thereof is less than 0.01% by mass, the thickening performance is not satisfactory. On the other hand, if it exceeds 1% by mass, defects such as a reduction in an aging stability of the ink viscosity are brought about in a certain case.

The ink composition for an aqueous ballpoint pen of the present invention has the dilatant fluid characteristic described above and can suitably contain, in addition to at least a colorant and water (tap water, refined water, distilled water, ion-exchanged water, purified water, and the like) which is a solvent as a balance, the respective components which are used usually for aqueous ink ballpoint pens, such as a water-soluble organic solvent, a viscosity controlling agent other than PVA, polysaccharides and boric acid salts each described above, a dispersant, a lubricant, a rust preventive, an antiseptic agent or a fungicide, a pH controlling agent, and the like as long as the effects of the present invention are not damaged.

Dyes which are dissolved or dispersed in water, conventionally known inorganic or organic pigments such as titanium oxide and the like, resin particle pigments containing pigments, pseudo pigments obtained by coloring resin emulsions with dyes, white plastic pigments, pigments obtained by coating iron oxide and titanium oxide in a multilayer on a surface of silica and mica as a base material, and the like can be used as the colorant used in the present invention as long as the effects of the present invention are not damaged.

The dye includes, for example, acid dyes such as Eosin, Foxin, Water Yellow #6-C, Acid Red, Water Blue #105, Brilliant Blue FCF, Nigrosine NB and the like; direct dyes such as Direct Black 154, Direct Sky Blue 5B, Violet BOOB and the like; and basic dyes such as rhodamine, methyl violet and the like.

The inorganic pigment includes, for example, azo lakes, insoluble azo pigments, chelate azo pigments, phthalocyanine pigments, perylene and perinone pigments, nitroso pigments, and the like. To be more specific, it includes inorganic pigments such as carbon black, titan black, zinc oxide, red iron oxide, aluminum, chromium oxide, iron black, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, haryte powders, calcium carbonate, white lead, Prussian blue, manganese violet, aluminum powders, brass powders, and the like, C.I. Pigment Blue 17, C.I. Pigment Blue 15, C.I. Pigment Blue 17, C.I. Pigment Blue 27, C.I. Pigment Red 5, C.I. Pigment Red 22, C.I. Pigment Red 38, C.I. Pigment Red 48, C.I. Pigment Red 49, C.I. Pigment Red 53, C.I. Pigment Red 57, C.I. Pigment Red 81, C.I. Pigment Red 104, C.I. Pigment Red 146, C.I. Pigment Red 245, C.I. Pigment Yellow 1, C.I. Pigment Yellow 3, C.I. Pigment Yellow 12, C.I. Pigment Yellow 13, C.I. Pigment Yellow 14, C.I. Pigment Yellow 17, C.I. Pigment Yellow 34, C.I. Pigment Yellow 55, C.I. Pigment Yellow 74, C.I. Pigment Yellow 95, C.I. Pigment Yellow 166, C.I. Pigment Yellow 167, C.I. Pigment Orange 5, C.I. Pigment Orange 13, C.I. Pigment Orange 16, C.I. Pigment Violet 1, C.I. Pigment Violet 3, C.I. Pigment Violet 19, C.I. Pigment Violet 23, C.I. Pigment Violet 50, C.I. Pigment Green 7, and the like.

The above colorants can be used alone or in a mixture of two or more kinds thereof.

A content of the above colorants can suitably be controlled in a range of 0.1 to 40% by mass based on a whole amount of the ink composition for an aqueous ballpoint pen.

The water-soluble organic solvent which can be used includes, for example, glycols such as ethylene glycol, diethylene glycol, triethylene glycol, propylene glycol, polyethylene glycol, 3-butylene glycol, thiodiethylene glycol, glycerin, and the like, glycol ethers such as ethylene glycol monomethyl ether, diethylene glycol monomethyl ether, and the like, and they can be used alone or in a mixture of two or more kinds thereof.

A content of the above water-soluble organic solvents is preferably 3 to 30% by mass based on a whole amount of the ink composition for an aqueous ballpoint pen.

The viscosity controlling agent which can be used is preferably, for example, at least one selected from the group consisting of synthetic high polymers and cellulose. To be specific, it includes methyl cellulose, ethyl cellulose, hydroxyethyl cellulose, carboxymethyl cellulose, starch glycolate and salts thereof, alginic acid propylene glycol ester, polyvinylpyrrolidone, polyvinyl methyl ether, polyacrylic acid and salts thereof, carboxyvinyl polymers, polyethylene oxide, copolymers of vinyl acetate and polyvinylpyrrolidone, cross-linking type acrylic acid polymers and salts thereof, non-cross-linking type acrylic acid polymers and salts thereof, styrene-acrylic acid copolymers and salts thereof, and the like.

The dispersant includes at least one of styrene-maleic acid copolymers and salts thereof, styrene-acrylic acid copolymers and salts thereof, α-methylstyrene-acrylic acid copolymers and salts thereof, polyacrylic acid-polymethacrylic acid copolymers, and the like.

The lubricant includes nonionic lubricants such as fatty acid esters of polyhydric alcohols which are also used as a surface treating agent for pigments, higher fatty acid esters of saccharides, polyoxyalkylene higher fatty acid esters, alkylphosphoric acid esters, and the like, anionic lubricants such as phosphoric acid esters, alkylsulfonic acid salts of higher fatty acid amides, alkylarylsulfonic acid salts, and the like, derivatives of polyalkylene glycols, fluorine base surfactants, polyether-modified silicones, and the like.

The rust preventive includes benzotriazole, tolyltriazole, cyclohexylammonium nitrite, saponins, and the like. The antiseptic agent or the fungicide includes phenol, sodium omadine, sodium benzoate, benzimidazole base compounds, and the like.

The pH controlling agent includes hydroxides of alkali metals, such as sodium hydroxide, potassium hydroxide, lithium hydroxide, and the like, amine compounds such as triethanolamine, diethanolamine, monoethanolamine, dimethylethanolamine, morpholine, triethylamine, and the like, ammonia, and the like.

Methods which have so far been known can be employed in order to manufacture the above ink composition for an aqueous ball pointpen, and it is obtained, for example, by adding at least a colorant and water and blending at least one of PVA and/or polysaccharides, and boric acid and a salt thereof, and the respective aqueous components described above in prescribed amounts so that the ink composition is provided with a dilatant fluid characteristic in at least a part of a region of a shear rate of 1 to 383 $s^{-1}$ (25° C.), followed by stirring and mixing them by means of a stirring equipment such as a homomixer, a disper and the like. Further, coarse particles contained in the ink composition may be removed, if necessary, by filtration or centrifugal separation, or the ink composition may be prepared while defoaming, heating and cooling.

In the ink composition for an aqueous ballpoint pen of the present invention, the viscosity at a shear rate of 383 $s^{-1}$ (25° C.) is preferably 5 to 150 mPa·s, more preferably 10 to 100 mPa·s.

If the above viscosity is lower than 5 mPa·s, the drawn lines are liable to be blurred and stained in a certain case. On the other hand, if it exceeds 150 mPa·s, the ink is reduced in a followability depending on the specifications of the ballpoint pen, and the drawn lines are liable to be bled in a certain case.

The viscosity described above can be controlled by suitably combining the respective ink components and the respective contents thereof.

The ink composition for an aqueous ballpoint pen of the present invention can be used by charging into a ballpoint pen equipped with a pen tip part such as a metal tip, a resin tip and the like.

The aqueous ink ballpoint pen which can be used is a ballpoint pen charged with the ink composition for an aqueous ballpoint pen having the composition described above, and it is preferably a ballpoint pen having a constitution in which the ink composition having the characteristics described above is changed in an ink reservoir comprising a pipe or a pipe-shaped molded matter equipped directly or via a relay member with a ballpoint pen tip rotatably holding a metal ball or the like and in which an ink follower is arranged on a rear end surface of the above ink composition. The ink follower includes substances which are not compatible with the ink composition for an aqueous ballpoint pen charged in the ink reservoir and which have a small specific gravity as compared with that of the above ink composition for an aqueous ballpoint pen, for example, polybutene, silicone oils, mineral oils and the like.

The structure of the ballpoint pen shall not specifically be restricted and may be, for example, a direct liquid type ballpoint pen having a collector structure (ink holding mechanism) in which a holder itself is used as an ink reservoir and in which the ink composition for an aqueous ballpoint pen having the composition described above is charged in the above holder.

It is guessed as follows why the ink composition for an aqueous ballpoint pen of the present invention which is constituted in the manner described above exerts a function of making it possible to draw sharp and fine lines which are less likely to be blurred at an initial part of writing and are written smoothly and which are clear at stop, jump and sweep parts to provide beautiful characters.

That is, it is because of the reasons that the ink composition for an aqueous ballpoint pen of the present invention is provided, as shown in FIG. 1, with a dilatant fluid characteristic in at least a part of a region of a shear rate of 1 to 383 $s^{-1}$ (25° C.), whereby the ink is less likely to be blurred at an initial part of writing and has a smooth writing feeling as compared with conventional gel inks showing a viscosity flow curve in which a viscosity is gradually reduced as a shear rate is elevated and that it exerts a suitable ink flowing characteristic in a range in which a writing speed and a writing pressure are varied at stop, jump and sweep parts.

The ink composition for an aqueous ballpoint pen of the present invention is very excellent in a continuous effect of exerting the effects of the present invention, and an exertion period and a duration of the effects thereof are extended. Further, the ink composition is water-soluble and therefore is excellent in an aging stability.

The key point of the ink composition for an aqueous ballpoint pen of the present invention is that it contains, as described above, at least water and a colorant and has a dilatant fluid characteristic in at least a part of a region of a shear rate of 1 to 383 $s^{-1}$ (25° C.). The embodiments in which at least one selected from PVA and/or polysaccharides, and boric acid and a salt thereof is added (PVA+boric acid and a salt thereof, polysaccharides+boric acid and a salt thereof, PVA+polysaccharides+boric acid and a salt thereof) have been shown as the examples of the preferred embodiments for exerting the dilatant fluid characteristic. However, if the rheological curve having a dilatant fluid characteristic found in the present invention as shown in FIG. 1 can be put into practice by using the other viscosity controlling agents (thickeners), the ink composition for an aqueous ballpoint pen of the present invention shall not be restricted to the embodiments described above.

EXAMPLES

Next, the present invention shall be explained in further details with reference to examples and comparative examples, but the present invention shall not be restricted to the examples shown below.

Examples 1 to 10 and Comparative Examples 1 to 5

The respective ink compositions for an aqueous ballpoint pen were prepared by an ordinary method according to a blend composition shown in the following Table 1.

The respective ink compositions (whole amount: 100% by mass) for an aqueous ballpoint pen thus obtained were used to measure an ink viscosity at a shear rate of 1 to 383 s$^{-1}$ (25° C.) by the following measuring method.

Further, the respective ink compositions (whole amount: 100% by mass) for an aqueous ballpoint pen obtained above were used to prepare aqueous ballpoint pens by the following method and evaluate stop, jump, sweep, an initial writing performance, and blurring and fading of the drawn lines by the respective evaluating methods shown below.

Figure 2:
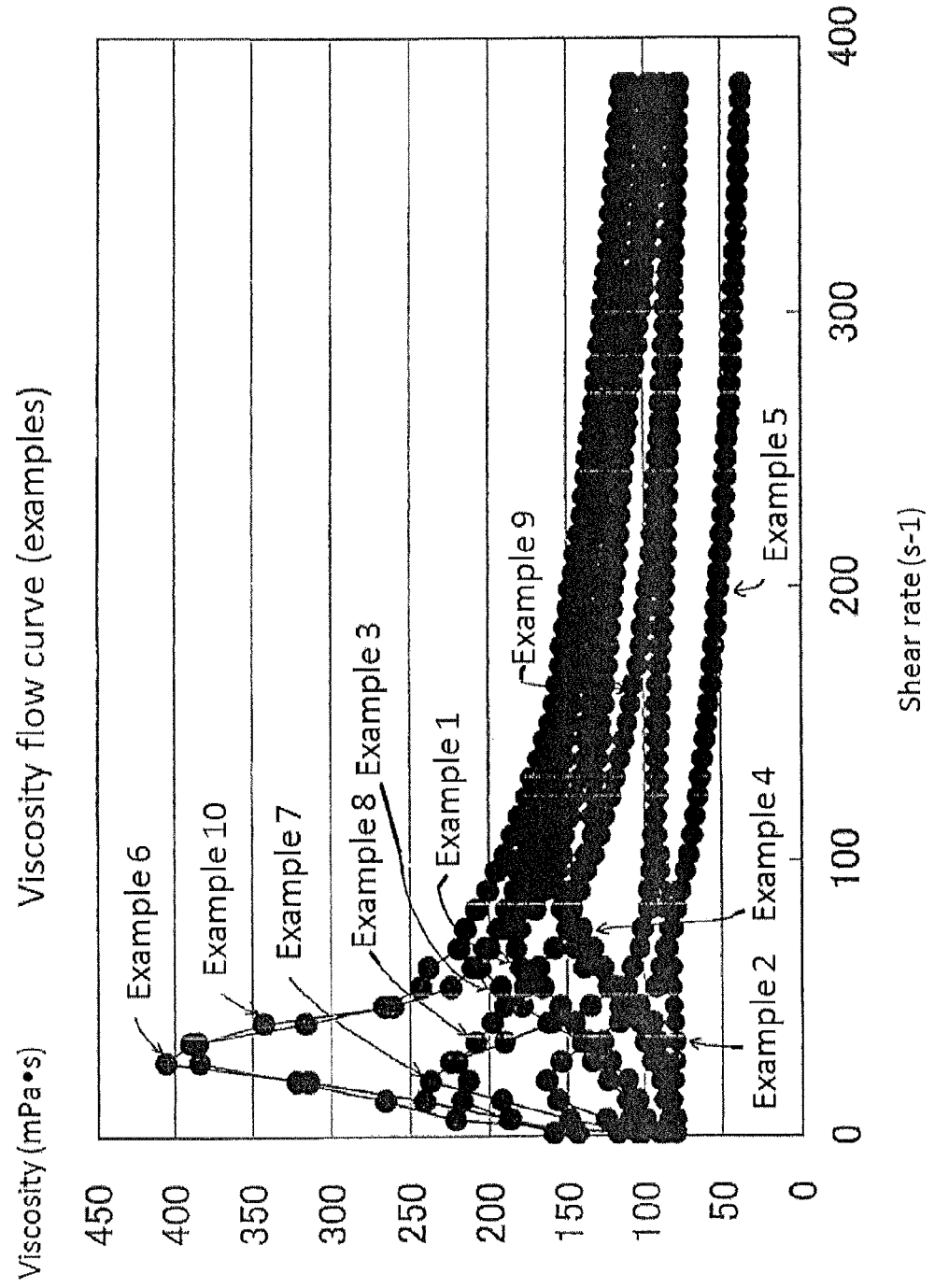
FIG. 2 is a characteristic chart (viscosity flow curves; examples) of the ink viscosities at the shear rates of 1 to 383 s$^{-1}$ (25° C.) in the respective ink compositions for an aqueous ballpoint pen prepared in Examples 1 to 10.
Figure 3:
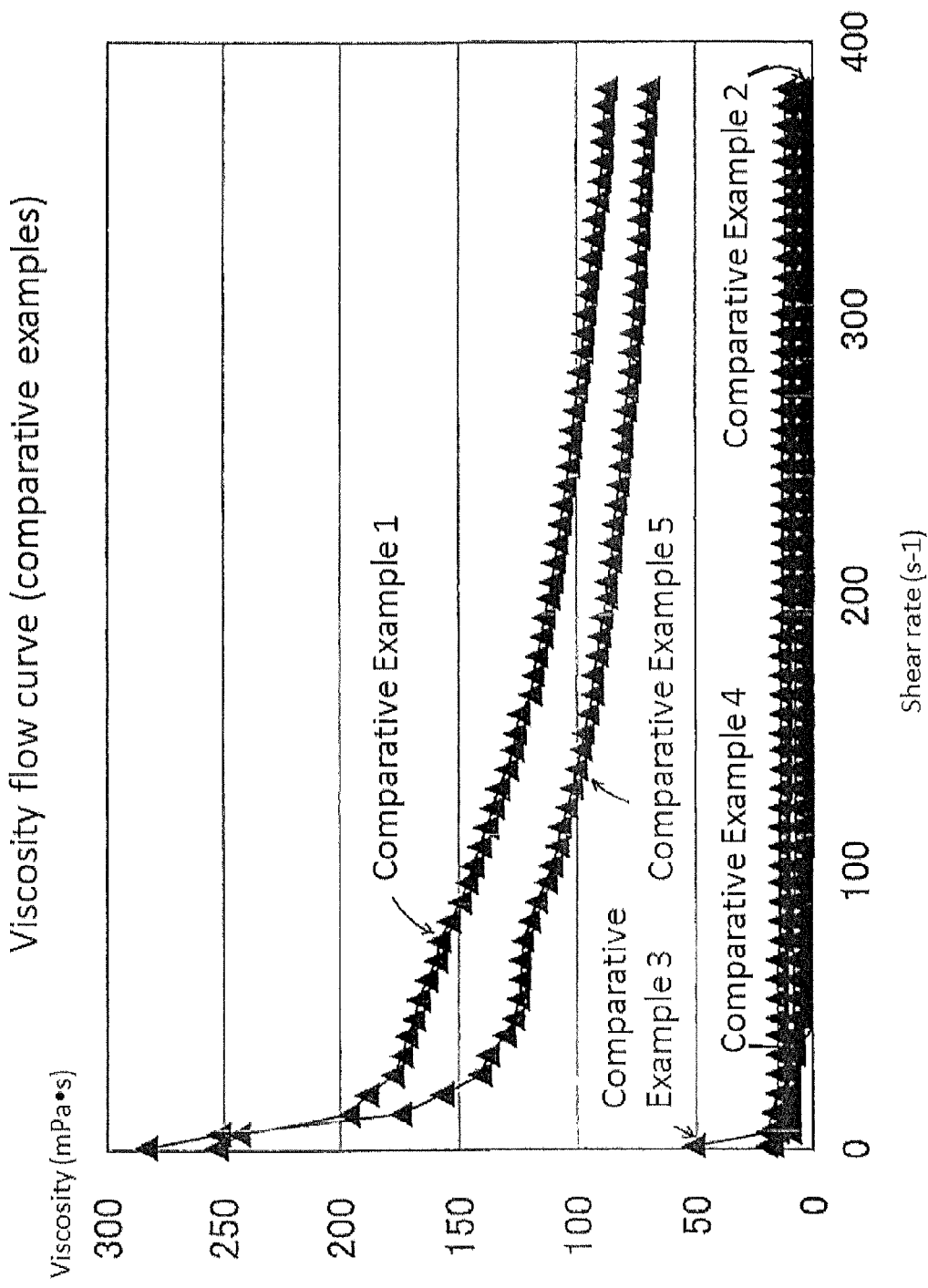
FIG. 3 is a characteristic chart (viscosity flow curves; comparative examples) of the ink viscosities at the shear rates of 1 to 383 s$^{-1}$ (25° C.) in the respective ink compositions for an aqueous ballpoint pen prepared in Comparative Examples 1 to 5.

The blend compositions and the respective evaluation results in Examples 1 to 10 and Comparative Examples 1 to 5 are shown in the following Table 1, and the ink viscosity values at a shear rate of 1 to 383 s$^{-1}$ (25° C.) are shown in the following Tables 2 and 3. Further, shown in FIG. 2 and FIG. 3 are the respective characteristic charts (viscosity flow curves: examples and comparative examples) of the ink viscosities at a shear rate of 1 to 383 s$^{-1}$ (25° C.) in Examples 1 to 10 and Comparative Examples 1 to 5 based on the results shown in Table 2 and Table 3.

Measuring Method of Ink Inviscosity Value:

The ink viscosities (mPa·s) at the respective shear rates were measured by means of an E type rotation viscometer (VISCOMETER RE215, manufactured by Toki Sangyo Co., Ltd.) with a corn: 1°34*R24, a measuring mode: slope measurement, a start rotation speed: 0 rpm, a top rotation speed: 100 rpm (383 s$^{-1}$), elevating time setting: 56 sec, and measuring temperature: 25° C.

Preparation of Aqueous Ink Ballpoint Pens:

A holder of a ballpoint pen (trade name: Signo UM-100, (manufactured by Mitsubishi Pencil Co., Ltd.) was used to charge each of the inks described above into a refill comprising a propylene-made ink reservoir having an inner diameter of 4.0 mm and a length of 113 mm, a stainless steel-made tip (cemented carbide ball, ball diameter: 0.7 mm), and a joint connecting the above reservoir with the tip, and an ink follower comprising polybutene was loaded at a rear end of the ink, whereby an aqueous ballpoint pen was prepared.

Evaluating Method of Stop:

The respective aqueous ballpoint pens prepared above were used to write a character "永" on a paper for a writing test with free hand, and the state of bleeding and blobbing in the dot of the first line of the character was visually observed to evaluate it according to the following criteria.

Evaluation Criteria:
○: bleeding and blobbing are scarcely observed
Δ: bleeding or blobbing is slightly observed
×: bleeding and blobbing are severely observed, and the drawn lines are stained Evaluating Method of Jump:

The respective aqueous ballpoint pens prepared above were used to write a character "永" on a paper for a writing test with free hand, and the state of jump at an end part of writing in the second line of the character was visually observed to evaluate it according to the following criteria.

Evaluation Criteria:
○: drawn lines at an end part of writing are very fine, and beautiful lines can be drawn without causing blurring
Δ: drawn lines are a little blurred, and a density thereof is low
×: drawn lines are heavily blurred and stained Evaluating Method of Sweep:

The respective aqueous ballpoint pens prepared above were used to write a character "永" on a paper for a writing test with free hand, and the grade of the fifth line of the character was visually observed to evaluate it according to the following criteria.

Evaluation Criteria:
○: drawn lines are not split at all, and beautiful lines can be drawn
Δ: drawn lines are a little split, and a density thereof is low
×: drawn lines are split and stained Evaluating Method of Initial Writing Performance:

The respective aqueous ballpoint pens prepared above were used to write a character on "永" a paper for a writing test with free hand, and the state of an ink flowing performance in the dot of the first line of the character was visually observed to evaluate it according to the following criteria.

Evaluation Criteria:
○: blurring is scarcely observed, and the fine dot can be marked
Δ: blurring is slightly observed, and the drawn lines are pale
×: blurring is severely observed, and the dot can scarcely be observed Evaluating Method of Bleeding and Blurring of Drawn Lines:

The respective aqueous ballpoint pens prepared above were used to write a character "永" on a paper for a writing test with free hand, and the state of jump at an end part of writing in the second line of the character was visually observed to evaluate it according to the following criteria.

Evaluation Criteria:
○: drawn lines at an end part of writing are very fine, and beautiful lines can be drawn without causing blurring and bleeding
Δ: drawn lines are a little blurred, and a density thereof is low, or slight bleeding is observed
×: drawn lines are heavily blurred or largely bled and stained

TABLE 1

| | | Example | | | | | | | | | |
|---|---|---|---|---|---|---|---|---|---|---|---|
| Total 100 mass % | | 1 | 2 | 3 | 4 | 5 | 6 | 7 | 8 | 9 | 10 |
| Blend composition | Coloring material: carbon black *1 | 7.0 | 7.0 | 7.0 | 7.0 | 7.0 | 7.0 | 6.5 | 6.5 | 7.0 | 7.0 |
| | Dispersant *2 | 5.5 | 5.5 | 5.5 | 5.5 | 5.5 | 5.5 | 4.5 | 4.5 | 5.5 | 5.5 |
| | Viscosity controlling agent A: polyvinyl alcohol A *3 | | 3.0 | 5.0 | | | | 1.4 | 1.2 | | |
| | Viscosity controlling agent A: polyvinyl alcohol B *4 | 2.3 | | | 4.5 | | 3.0 | | | | |
| | Viscosity controlling agent A: polyvinyl alcohol C *5 | | | | | 0.5 | | | | | |
| | Viscosity controlling agent B: sodium, tetraborate | | 0.3 | | | 0.1 | 0.1 | | | | |
| | Viscosity controlling agent B: ammonium borate | 0.5 | | 0.2 | 0.1 | | | 0.7 | 0.6 | 0.3 | 0.3 |

TABLE 1-continued

Total 100 mass %

|  |  |  |  |  |  |  |  |  |  |  |  |
|---|---|---|---|---|---|---|---|---|---|---|---|
|  | Viscosity controlling agent C: cross-linking type acrylic acid copolymer *6 |  |  |  |  |  |  |  | 0.1 |  |  |
|  | Viscosity controlling agent C: cross-linking type acrylic acid copolymer *7 |  |  |  |  |  |  |  |  |  |  |
|  | Viscosity controlling agent C: hydroxypropyl guar gum *8 |  |  |  |  |  |  |  |  | 0.1 | 0.3 |
|  | Viscosity controlling agent C: tara gum *9 |  |  |  |  |  |  |  |  |  |  | 0.4 |
|  | Lubricant: phosphoric acid ester *10 | 0.5 | 0.5 | 0.5 | 0.5 | 0.5 | 0.5 | 2.0 | 0.5 | 0.5 | 0.5 |
|  | Rust preventive: benzotriazole | 0.3 | 0.3 | 0.3 | 0.3 | 0.3 | 0.3 | 0.3 | 0.3 | 0.3 | 0.3 |
|  | Antiseptic agent *11 | 0.3 | 0.3 | 0.3 | 0.3 | 0.3 | 0.3 | 0.3 | 0.3 | 0.3 | 0.3 |
|  | pH controlling agent: triethanolamine | 2.5 | 2.5 | 2.5 | 2.5 | 2.5 | 2.5 | 2.5 | 2.5 | 2.5 | 2.5 |
|  | Solvent: propylene glycol | 12.0 | 12.0 | 12.0 | 12.0 | 12.0 | 12.0 | 12.0 | 12.0 | 12.0 | 12.0 |
|  | Water: (ion-exchanged water) | Balance | Balance | Balance | Balance | Balance | Balance | Balance | Balance | Balance | Balance |
| Evaluation | Stop | ○ | ○ | ○ | ○ | ○ | ○ | ○ | ○ | Δ | ○ |
|  | Jump | ○ | ○ | ○ | ○ | Δ | ○ | ○ | ○ | ○ | ○ |
|  | Sweep | ○ | ○ | Δ | ○ | ○ | ○ | ○ | ○ | ○ | ○ |
|  | Initial writing performance | ○ | ○ | Δ | ○ | ○ | Δ | ○ | ○ | ○ | Δ |
|  | Bleeding and blurring of drawn lines | ○ | ○ | ○ | ○ | ○ | ○ | ○ | ○ | ○ | Δ |

|  |  | Comparative Example ||||| 
|---|---|---|---|---|---|---|
|  |  | 1 | 2 | 3 | 4 | 5 |
| Blend composition | Coloring material: carbon black *1 | 7.0 | 7.0 | 7.0 | 7.0 | 6.5 |
|  | Dispersant *2 | 5.5 | 5.5 | 5.5 | 5.5 | 4.5 |
|  | Viscosity controlling agent A: polyvinyl alcohol A *3 |  |  |  |  |  |
|  | Viscosity controlling agent A: polyvinyl alcohol B *4 |  |  | 2.3 |  |  |
|  | Viscosity controlling agent A: polyvinyl alcohol C *5 |  |  |  |  |  |
|  | Viscosity controlling agent B: sodium tetraborate |  |  |  |  |  |
|  | Viscosity controlling agent B: ammonium borare |  |  |  | 0.5 |  |
|  | Viscosity controlling agent C: cross-linking type acrylic acid copolymer *6 | 0.6 |  |  |  |  |
|  | Viscosity controlling agent C: cross-linking rype acrylic acid copolymer *7 |  |  |  |  | 0.3 |
|  | Viscosity controlling agent C: hydroxypropyl guar gum *8 |  |  |  |  |  |
|  | Viscosity controlling agent C: tara gum *9 |  |  |  |  |  |
|  | Lubricant: phosphoric acid ester *10 | 0.5 | 0.5 | 0.5 | 0.5 | 0.5 |
|  | Rust preventive: benzotriazole | 0.3 | 0.3 | 0.3 | 0.3 | 0.3 |
|  | Antiseptic agent *11 | 0.3 | 0.3 | 0.3 | 0.3 | 0.3 |
|  | pH controlling agent: triethanolamine | 2.5 | 2.5 | 2.5 | 2.5 | 2.5 |
|  | Solvent: propylene glycol | 12.0 | 12.0 | 12.0 | 12.0 | 12.0 |
|  | Water: (ion-exchanged water) | Balance | Balance | Balance | Balance | Balance |
| Evaluation | Stop | Δ | X | ○ | X | ○ |
|  | Jump | Δ | ○ | Δ | ○ | Δ |
|  | Sweep | X | ○ | X | ○ | X |
|  | Initial writing performance | X | ○ | Δ | ○ | Δ |
|  | Bleeding and blurring of drawn lines | ○ | X | 0 | X | Δ |

*1 to *11 in Table 1 described above show the following,
*1: Carbon black MA-100 (manufactured by Mitsubishi Chemical Corporation)
*2: JONCRYL 61J (manufactured by BASF Japan Ltd.)
*3: G type Gohsenol GL-05 (manufactured by Nippon Synthetic Chemical Industry Co., Ltd.), saponification degree: 86.5 to 89.0 mol %, polymerization degree: 500
*4: J Poval JF-05 (manufactured by Japan Vam & Poval Co., Ltd.), saponification degree: 98 to 99 mol %, polymerization degree: 500
*5: J Poval JF-17 (manufactured by Japan Vam & Poval Co., Ltd.), saponification degree: 98 to 99 mol %, polymerization degree: 1700
*6: Primal TT-935 (manufactured by Rohm & Haas Japan Co., Ltd.)
*7: Primal TT-615 (manufactured by Rohm & Haas Japan Co., Ltd.)
*8: Jaguar HP (manufactured by Sansho Co., Ltd.)
*9: Spino Gum (manufactured by Fuso Chemical Co., Ltd.)
*10: Phosphoric acid ester RS-610 (manufactured by Toho Chemical Industry Co., Ltd.)
*11: Bestcide 600 (manufactured by Nippon Soda Co., Ltd.)

TABLE 2

| Shear rate [1/s] | Viscosity [mPa · s] |||||||||| |||||
|---|---|---|---|---|---|---|---|---|---|---|---|---|---|---|
|  | Example |||||||||| Comparative Example ||||
|  | 1 | 2 | 3 | 4 | 5 | 6 | 7 | 8 | 9 | 10 | 1 | 2 | 3 | 4 | 5 |
| 1 | 89 | 80 | 105 | 80 | 102 | 144 | 105 | 159 | 91 | 118 | 253 | 17 | 51 | 20 | 283 |
| 6 | 100 | 80 | 110 | 84 | 125 | 186 | 149 | 188 | 80 | 221 | 243 | 10 | 20 | 15 | 252 |
| 13 | 105 | 82 | 112 | 87 | 156 | 241 | 192 | 217 | 85 | 266 | 196 | 10 | 17 | 13 | 175 |

TABLE 2-continued

| Shear rate [1/s] | Viscosity [mPa · s] | | | | | | | | | | | | | | |
|---|---|---|---|---|---|---|---|---|---|---|---|---|---|---|---|
| | Example | | | | | | | | | | Comparative Example | | | | |
| | 1 | 2 | 3 | 4 | 5 | 6 | 7 | 8 | 9 | 10 | 1 | 2 | 3 | 4 | 5 |
| 20 | 111 | 81 | 124 | 89 | 163 | 314 | 237 | 213 | 86 | 322 | 189 | 10 | 15 | 11 | 157 |
| 27 | 122 | 80 | 134 | 90 | 154 | 406 | 224 | 220 | 95 | 384 | 178 | 10 | 15 | 10 | 141 |
| 34 | 127 | 80 | 141 | 92 | 137 | 390 | 190 | 208 | 100 | 385 | 174 | 8 | 15 | 10 | 138 |
| 41 | 146 | 81 | 162 | 95 | 117 | 316 | 160 | 198 | 103 | 343 | 172 | 8 | 15 | 9 | 131 |
| 47 | 155 | 82 | 178 | 104 | 103 | 267 | 135 | 190 | 117 | 261 | 169 | 8 | 15 | 5 | 127 |
| 54 | 166 | 82 | 192 | 111 | 93 | 243 | 119 | 177 | 124 | 224 | 167 | 8 | 15 | 5 | 125 |
| 61 | 180 | 82 | 206 | 127 | 89 | 238 | 108 | 168 | 139 | 210 | 164 | 8 | 15 | 5 | 124 |
| 68 | 182 | 84 | 200 | 134 | 87 | 219 | 103 | 158 | 145 | 203 | 159 | 8 | 15 | 5 | 124 |
| 75 | 180 | 84 | 187 | 141 | 82 | 215 | 101 | 150 | 148 | 194 | 158 | 8 | 14 | 5 | 123 |
| 82 | 170 | 87 | 178 | 153 | 80 | 208 | 97 | 147 | 151 | 189 | 154 | 8 | 14 | 5 | 120 |
| 89 | 166 | 88 | 173 | 155 | 77 | 201 | 97 | 142 | 147 | 184 | 149 | 8 | 14 | 5 | 117 |
| 96 | 164 | 90 | 172 | 157 | 74 | 195 | 95 | 138 | 142 | 181 | 147 | 8 | 14 | 5 | 113 |
| 102 | 161 | 90 | 169 | 153 | 71 | 190 | 95 | 133 | 138 | 176 | 144 | 8 | 14 | 5 | 111 |
| 109 | 161 | 92 | 169 | 152 | 69 | 185 | 94 | 129 | 134 | 175 | 141 | 7 | 14 | 4 | 108 |
| 116 | 158 | 92 | 166 | 148 | 67 | 180 | 93 | 126 | 134 | 171 | 138 | 7 | 14 | 4 | 107 |
| 123 | 156 | 93 | 164 | 145 | 65 | 175 | 92 | 122 | 132 | 168 | 136 | 7 | 14 | 4 | 104 |
| 130 | 155 | 92 | 163 | 141 | 64 | 172 | 92 | 119 | 132 | 166 | 133 | 7 | 13 | 4 | 102 |
| 137 | 151 | 93 | 161 | 138 | 62 | 167 | 92 | 116 | 130 | 164 | 130 | 7 | 13 | 4 | 100 |
| 144 | 151 | 93 | 159 | 138 | 60 | 164 | 91 | 113 | 128 | 162 | 127 | 7 | 13 | 4 | 98 |
| 150 | 149 | 93 | 157 | 136 | 59 | 160 | 90 | 111 | 129 | 160 | 126 | 7 | 13 | 4 | 97 |
| 157 | 146 | 93 | 155 | 135 | 58 | 156 | 90 | 109 | 126 | 158 | 124 | 7 | 13 | 4 | 95 |
| 164 | 146 | 92 | 154 | 135 | 57 | 153 | 89 | 107 | 126 | 156 | 119 | 7 | 13 | 4 | 93 |
| 171 | 144 | 91 | 152 | 135 | 56 | 150 | 90 | 104 | 124 | 154 | 118 | 7 | 13 | 4 | 93 |
| 178 | 143 | 90 | 151 | 131 | 55 | 147 | 89 | 102 | 123 | 153 | 117 | 7 | 13 | 4 | 91 |

TABLE 3

(Table 2 continued)

| Shear rate [1/s] | Viscosity [mPa · s] | | | | | | | | | | | | | | |
|---|---|---|---|---|---|---|---|---|---|---|---|---|---|---|---|
| | Example | | | | | | | | | | Comparative Example | | | | |
| | 1 | 2 | 3 | 4 | 5 | 6 | 7 | 8 | 9 | 10 | 1 | 2 | 3 | 4 | 5 |
| 185 | 140 | 90 | 149 | 131 | 54 | 144 | 88 | 101 | 122 | 151 | 115 | 7 | 13 | 4 | 90 |
| 192 | 138 | 90 | 147 | 128 | 53 | 141 | 88 | 99 | 121 | 149 | 114 | 7 | 13 | 4 | 89 |
| 199 | 138 | 89 | 146 | 127 | 52 | 138 | 87 | 98 | 120 | 148 | 112 | 7 | 12 | 4 | 87 |
| 205 | 136 | 89 | 144 | 124 | 51 | 136 | 87 | 96 | 118 | 145 | 110 | 7 | 12 | 4 | 87 |
| 212 | 135 | 88 | 143 | 122 | 50 | 133 | 86 | 95 | 117 | 144 | 109 | 7 | 12 | 4 | 85 |
| 219 | 133 | 88 | 141 | 120 | 50 | 131 | 86 | 94 | 116 | 142 | 108 | 7 | 12 | 4 | 85 |
| 226 | 132 | 88 | 139 | 118 | 49 | 128 | 86 | 93 | 116 | 140 | 107 | 7 | 12 | 4 | 84 |
| 233 | 131 | 87 | 138 | 118 | 48 | 126 | 85 | 93 | 115 | 139 | 106 | 7 | 12 | 4 | 83 |
| 240 | 129 | 87 | 137 | 115 | 47 | 124 | 85 | 92 | 114 | 137 | 105 | 7 | 12 | 4 | 82 |
| 247 | 128 | 87 | 136 | 113 | 47 | 122 | 84 | 91 | 113 | 137 | 103 | 7 | 12 | 4 | 81 |
| 254 | 126 | 86 | 135 | 112 | 46 | 120 | 83 | 90 | 112 | 135 | 102 | 7 | 12 | 4 | 80 |
| 260 | 125 | 86 | 133 | 110 | 45 | 118 | 84 | 89 | 112 | 133 | 102 | 7 | 12 | 4 | 80 |
| 267 | 125 | 85 | 132 | 110 | 44 | 117 | 83 | 89 | 111 | 132 | 101 | 7 | 12 | 4 | 79 |
| 274 | 124 | 85 | 131 | 108 | 44 | 115 | 83 | 88 | 110 | 130 | 100 | 7 | 12 | 4 | 78 |
| 281 | 122 | 85 | 130 | 106 | 43 | 113 | 82 | 87 | 109 | 130 | 99 | 7 | 12 | 4 | 77 |
| 288 | 121 | 85 | 129 | 104 | 43 | 111 | 81 | 87 | 108 | 129 | 97 | 7 | 12 | 4 | 77 |
| 295 | 120 | 84 | 127 | 103 | 42 | 110 | 82 | 86 | 108 | 127 | 97 | 7 | 12 | 4 | 76 |
| 302 | 119 | 84 | 127 | 101 | 42 | 108 | 81 | 86 | 106 | 126 | 96 | 7 | 12 | 4 | 75 |
| 309 | 118 | 83 | 125 | 100 | 42 | 107 | 81 | 85 | 106 | 124 | 95 | 7 | 11 | 4 | 75 |
| 315 | 118 | 83 | 125 | 99 | 41 | 105 | 81 | 84 | 105 | 123 | 95 | 7 | 11 | 4 | 74 |
| 322 | 116 | 83 | 123 | 98 | 41 | 104 | 80 | 84 | 104 | 122 | 94 | 6 | 11 | 4 | 74 |
| 329 | 115 | 82 | 122 | 96 | 40 | 103 | 80 | 83 | 104 | 120 | 93 | 6 | 11 | 4 | 73 |
| 336 | 114 | 82 | 122 | 95 | 40 | 101 | 79 | 82 | 103 | 119 | 92 | 6 | 11 | 4 | 73 |
| 343 | 113 | 82 | 120 | 94 | 39 | 100 | 79 | 82 | 102 | 118 | 91 | 6 | 11 | 4 | 72 |
| 350 | 112 | 81 | 120 | 92 | 39 | 99 | 78 | 81 | 101 | 117 | 90 | 6 | 11 | 4 | 72 |
| 357 | 111 | 81 | 119 | 92 | 39 | 98 | 78 | 80 | 100 | 115 | 89 | 6 | 11 | 4 | 71 |
| 364 | 110 | 80 | 117 | 90 | 38 | 96 | 78 | 80 | 100 | 114 | 89 | 6 | 11 | 4 | 71 |
| 370 | 110 | 80 | 117 | 90 | 38 | 95 | 78 | 80 | 99 | 113 | 88 | 6 | 11 | 4 | 70 |
| 377 | 109 | 80 | 116 | 89 | 37 | 94 | 77 | 79 | 98 | 112 | 88 | 6 | 11 | 4 | 70 |
| 383 | 109 | 80 | 115 | 88 | 37 | 94 | 77 | 79 | 97 | 112 | 87 | 6 | 11 | 4 | 69 |

The ink viscosity values of the ink compositions at a shear rate of 1 to 383 $s^{-1}$ (25° C.) are shown in Table 2 and Table 3 described above, wherein the ink compositions were prepared in Examples 1 to 10 and Comparative Examples 1 to 5 according to the blend compositions shown in Table 1.

To discuss the results shown in Table 2 and Table 3, in Example 1 out of Examples 1 to 10, a maximum value (peak value) of the viscosity is 182 mPa·s at a shear rate of 68 $s^{-1}$ (25° C.) (hereinafter, this is shown as "peak viscosity value 182 mPa·s, 68 ($s^{-1}$)"). Showing below the results of Examples 2 to 10 in the manner described above, shown are "peak viscosity value 93 mPa·s, 137 to 150 ($s^{-1}$)" in Example 2, "peak viscosity value 206 mPa·s, 61 ($s^{-1}$)" in Example 3, "peak viscosity value 157 mPa·s, 96 ($s^{-1}$)" in Example 4, "peak viscosity value 163 mPa·s, 20 ($s^{-1}$)" in Example 5, "peak viscosity value 406 mPa·s, 27 ($s^{-1}$)" in Example 6, "peak viscosity value 237 mPa·s, 20 ($s^{-1}$)" in Example 7, "peak viscosity value 220 mPa·s, 27 ($s^{-1}$)" in Example 8, "peak viscosity value 151 mPa·s, 82 ($s^{-1}$)" in Example 9, and "peak viscosity value 385 mPa·s, 34 ($s^{-1}$)" in Example 10, and the inks were changed to pseudoplastic fluids at the borders of the above shear rates. Also, the viscosity at a shear rate of 383 $s^{-1}$ (25° C.) fell as well in a preferred range of 5 to 150 mPa·s.

In contrast with this, in Comparative Examples 1 to 5, the viscosity flow curves (shown in conventional gel inks and the like) in which a viscosity is gradually reduced as a shear rate is elevated without having the peak viscosity values are given as shown in Tables 2 and 3 and the characteristic charts (viscosity flow curves: comparative examples) of FIG. 3 obtained by representing graphically the results shown in Tables 2 and 3.

To discuss overall the results shown in Table 1 to Table 3 and FIG. 1 to FIG. 3, it has become clear that in the ink compositions for an aqueous ballpoint pen prepared in Examples 1 to 10 supported by the present invention, it is not until the inks are provided, as shown in Tables 2 and 3 and the characteristic charts (viscosity flow curves: examples) obtained by representing graphically the results shown in Tables 2 and 3, with a dilatant fluid characteristic in at least a part of a region of a shear rate of 1 to 383 $s^{-1}$ (25° C.) that obtained are the ink compositions for an aqueous ballpoint pen capable of drawing sharp and fine lines which are less likely to be blurred at an initial part of writing and are written smoothly and which are clear at stop, jump and sweep parts to provide beautiful characters as compared with the conventional inks showing a viscosity flow curve (FIG. 3) prepared in Comparative Examples 1 to 5 in which a viscosity is gradually reduced as a shear rate is elevated.

INDUSTRIAL APPLICABILITY

An ink composition for an aqueous ballpoint pen which is suited to an aqueous ballpoint pen is obtained.

What is claimed is:
1. An ink composition for an aqueous ballpoint pen comprising at least water and a colorant and having a dilatant fluid characteristic in at least a part of a region of a shear rate of 1 to 383 $s^{-1}$ (25° C.), wherein the viscosity at a shear rete of 383 $s^{-1}$ (25° C.) is 5 to 150 mPa·s.
2. The ink composition for an aqueous ballpoint pen as described in claim 1, comprising at least one selected from polyvinyl alcohol and/or polysaccharides, and boric acid and a salt thereof.
3. An aqueous ballpoint pen charged with the ink composition for an aqueous ballpoint pen as described in claim 1.
4. An aqueous ballpoint pen charged with the ink composition for an aqueous ballpoint pen as described in claim 2.

* * * * *